US010816050B2

(12) United States Patent
Elstorpff et al.

(10) Patent No.: US 10,816,050 B2
(45) Date of Patent: Oct. 27, 2020

(54) BRAKE LINING FOR DISC BRAKES OF RAIL VEHICLES

(71) Applicant: KNORR-BREMSE SYSTEME FÜR SCHIENENFAHRZEUGE GMBH, Munich (DE)

(72) Inventors: Marc-Gregory Elstorpff, Munich (DE); Michael Mathieu, Puchheim (DE); Rupert Lang, Schmidmühlen (DE); Jörg Huber, Munich (DE); Erich Fuderer, Fürstenfeldbruck (DE); Bernhard Hämmerl, Maisach (DE); Markus Seidl, Unterföhring (DE); Marco Langwadt, Munich (DE)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 0 days.

(21) Appl. No.: 16/070,185

(22) PCT Filed: Jan. 12, 2017

(86) PCT No.: PCT/EP2017/050603
§ 371 (c)(1),
(2) Date: Jul. 13, 2018

(87) PCT Pub. No.: WO2017/121821
PCT Pub. Date: Jul. 20, 2017

(65) Prior Publication Data
US 2018/0372173 A1 Dec. 27, 2018

(30) Foreign Application Priority Data

Jan. 13, 2016 (DE) .......................... 10 2016 100 454

(51) Int. Cl.
*F16D 65/095* (2006.01)
*F16D 65/097* (2006.01)
(Continued)

(52) U.S. Cl.
CPC ....... *F16D 65/0977* (2013.01); *F16D 65/092* (2013.01); *F16D 69/0408* (2013.01);
(Continued)

(58) Field of Classification Search
CPC .............. F16D 65/0977; F16D 65/092; F16D 69/0408; F16D 2069/002; F16D 2069/0433; F16D 2069/0441; F16D 65/095
See application file for complete search history.

(56) References Cited

U.S. PATENT DOCUMENTS 2,431,774 A * 12/1947 Schumacher ............ B61H 5/00
188/250 R
3,198,294 A * 8/1965 Stacy .................... F16D 65/092
188/234

(Continued)

FOREIGN PATENT DOCUMENTS

CN 1811216 A 8/2006
CN 101975234 A 2/2011
(Continued)

OTHER PUBLICATIONS

Search Report and Written Opinion for International Patent Application No. PCT/EP2017/050603; dated Apr. 26, 2017.

*Primary Examiner* — Thomas W Irvin
(74) *Attorney, Agent, or Firm* — Barnes & Thornburg LLP

(57) ABSTRACT

A brake lining for a disc brake includes a distribution of lining elements which are arranged on a lining support or on group supports in groups, and the group supports are secured
(Continued)

to the lining support. The lining elements have first lining elements and second lining elements, and the group supports have a first group support and a second group support. The first lining elements are arranged on the first group support or on the lining support in a non-tiltable and/or inflexible manner, and the second lining elements are arranged on the second group support or on the lining in a tiltable and/or flexible manner.

20 Claims, 8 Drawing Sheets

(51) Int. Cl.
*F16D 69/04* (2006.01)
*F16D 65/092* (2006.01)
*F16D 69/00* (2006.01)

(52) U.S. Cl.
CPC .................. *F16D 2069/002* (2013.01); *F16D 2069/0433* (2013.01); *F16D 2069/0441* (2013.01)

(56) References Cited

U.S. PATENT DOCUMENTS

| | | | | |
|---|---|---|---|---|
| 3,297,117 A * | 1/1967 | Freholm | ............... | F16D 65/092 188/234 |
| 5,538,108 A * | 7/1996 | Russo | ................... | F16D 65/092 188/250 E |
| 5,934,418 A * | 8/1999 | Wirth | ................. | F16D 65/0006 188/217 |
| 7,051,847 B2 * | 5/2006 | Wirth | ................... | F16D 65/092 188/250 B |
| 7,648,007 B2 * | 1/2010 | Russo | ................. | F16D 65/0006 188/250 E |
| 7,661,515 B2 * | 2/2010 | Maehara | ............... | F16D 65/092 188/250 B |
| 8,215,461 B2 * | 7/2012 | Holme | ................ | F16D 69/0408 188/250 G |
| 8,919,503 B2 * | 12/2014 | Hiramatsu | ............... | B61H 5/00 188/250 B |
| 9,206,865 B2 * | 12/2015 | Sigl | ....................... | F16D 65/092 |
| 9,394,953 B2 * | 7/2016 | Kato | ........................ | B61H 5/00 |
| 9,441,694 B2 * | 9/2016 | Maehara | ............... | F16D 65/092 |
| D793,282 S * | 8/2017 | Fujimoto | .................... | D12/180 |
| 10,030,725 B2 * | 7/2018 | Kato | ..................... | F16D 65/092 |
| 2018/0017123 A1 | 1/2018 | Elstorpff et al. | | |

FOREIGN PATENT DOCUMENTS

| | | |
|---|---|---|
| CN | 201991974 U | 9/2011 |
| CN | 102359523 A | 2/2012 |
| CN | 104455105 A | 3/2015 |
| CN | 204610633 U | 9/2015 |
| DE | 19840065 A1 | 3/2000 |
| DE | 102005030619 A1 | 2/2006 |
| DE | 202010007333 U1 | 10/2010 |
| DE | 202011001991 U1 | 3/2011 |
| DE | 102014119491 A1 | 6/2016 |
| EP | 0784761 A1 | 7/1997 |
| EP | 2713074 A1 | 4/2014 |
| FR | 2689195 A1 | 10/1993 |
| GB | 1089955 A | 11/1967 |

* cited by examiner

BRAKE LINING FOR DISC BRAKES OF RAIL VEHICLES

CROSS REFERENCE AND PRIORITY CLAIM

This patent application is a U.S. National Phase of International Patent Application No. PCT/EP2017/050603, filed Jan. 12, 2017, which claims priority to German Patent Application No. 10 2016 100 454.5 filed Jan. 13, 2016, the disclosure of which being incorporated herein by reference in their entireties.

FIELD

Disclosed embodiments relate to a brake lining for a disk brake and, in particular, to a brake lining for a disk brake of rail vehicles with improved properties under wet conditions and under icy conditions.

BACKGROUND

Brake linings such as are used, for example, in rail vehicle disk brakes frequently do not have an approximately constant input of heat into the disk brake during energy-rich braking processes.

SUMMARY

Disclosed embodiments relate to a partially flexible brake lining for a disk brake, wherein the brake lining has a distribution of lining elements which are arranged in groups on group supports, wherein the group supports are attached to the lining support (similar to the ISOBAR principle) or are attached directly to the lining support (similar to the flex pad).

BRIEF DESCRIPTION OF THE FIGURES

The disclosed embodiments are better understood from the following detailed description and the respective drawings of the different disclosed embodiments, which, however, are not to be understood as meaning that they limits the disclosure to the specific embodiments but rather merely serve for the purpose of explanation and to promote understanding.

DETAILED DESCRIPTION

Figure 1:
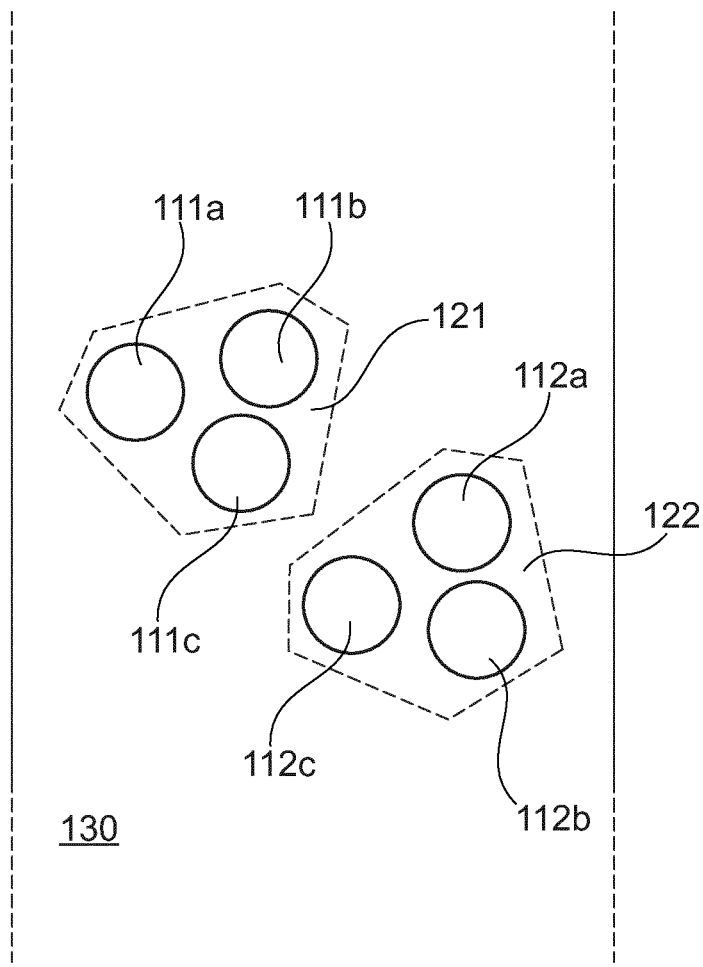
FIG. 1 shows a schematic partial illustration of a brake lining according to an disclosed embodiment of the presently disclosed embodiments.

Disclosed embodiments relate to a partially flexible brake lining for a disk brake, wherein the brake lining has a distribution of lining elements which are arranged in groups on group supports, wherein the group supports are attached to the lining support (similar to the ISOBAR principle) or are attached directly to the lining support (similar to the flex pad).

An improved brake lining has been proposed in EP 0 784 761 B1 in which the overall lining surface is divided into a plurality of small elements. The disclosed brake lining improves transmission of the brake application force from the caliper lever to the lining elements in order thereby to achieve a uniform input of heat. This ensures the caliper lever force is distributed uniformly between the upper and lower halves of the elastically deformable lining support by the lining holder. Furthermore, in the flexible brake lining mentioned, the force acting on half of the brake support is respectively supported by means of three support plates (fins) which are coupled to a lining support via a spherical cap joint, as a result of which all the support plates are loaded uniformly (ISOBAR principle). Each carrier plate in turn divides the force uniformly among the three lining elements, which are also coupled to a support plate via a spherical cap joint. The subassembly, which is composed of a support plate and the lining elements which are supported thereon, is also referred to as a group element.

Further flexible brake linings are disclosed in DE 10 2005 030 619 B4 or in DE 20 2011 001 991 U1, in which the lining elements are supported directly on a lining support (as what is referred to as a flex pad) by means of a spherical cap joint. The lining elements can as a result orient themselves in parallel with the surface of the brake disk. However, the distribution of the brake application force is no longer as good as in the lining variant which is described above and which permits a more uniform input of heat. This results in disadvantages for high speed trains which require the most uniform possible input of heat into the disk brake.

These flexible brake linings also have a uniform coefficient of friction (approximately 0.35) between the brake lining and the brake disk when there are different braking requirements. However, exceptions here are braking operations under wet conditions and under icy conditions. These are generally problematic for all braking operations because the coefficient of friction between the brake lining and the brake disk generally drops. This behavior is also taken into account in the corresponding guidelines by means of relatively low permissible coefficients of friction (>0.25) for braking operations under wet conditions. However, in particular in the presence of ice on the brake disk extremely low coefficients of friction (<0.1) can unacceptably lengthen the braking distance. The specific flexible brake linings exhibit here a relatively poor braking effect under wet conditions and under icy conditions, as what are referred to as "rigid" brake linings.

There is, therefore, a conventional conflict between the requirement for the most uniform possible input of heat from the brake lining into the brake disk as a result of high flexibility of the brake lining and the request for the most uniform possible braking behavior under all operating conditions, in particular even under wet conditions and under icy conditions, and there is a need for alternative brake linings which satisfy these requirements.

The abovementioned technical problem is solved by a brake lining as disclosed herein, wherein lining elements may comprise one or more first lining elements and second lining elements. The group supports comprise a first group support and a second group support, wherein the first lining elements are arranged in a non-tiltable and inflexible fashion (i.e. they cannot tilt and they are also connected in a largely rigid fashion) on the first group support or on the lining support and the second lining elements are arranged in a tiltable and flexible fashion (i.e. they can also tilt and, if appropriate, also slide) on the second group support or the lining support.

The term "tiltable" relates to relative tilting between the brake disk of the disk brake and the surface of the brake lining During the braking process, these two surfaces are ideally oriented in parallel, with the result that tilting gives rise to non-parallel orientation of the brake lining and of the disk of the disk brake. On the other hand, the tilting also leads to a situation in which when there is non-parallel orientation of the specified surfaces they orient themselves in parallel automatically.

The term flexible relates to relative sliding between the brake disk of the disk brake and the surface of the brake lining During the braking process, a flexible connection permits sliding of the lining element perpendicularly with respect to the surface of the brake disk and therefore compensation of the contact pressure values per unit area.

The group supports, the lining elements and the lining support are separate components, wherein the group supports can be attached, for example, in a movable fashion to the lining support.

Exemplary embodiments solve the abovementioned technical problem in that the brake lining uses lining elements with a joint-like support relative to the lining support or to the support plates (group support) and lining elements without a joint-like support relative to the lining support or to the support plates (group support). Attempts have revealed that the rigidly coupled lining elements give rise to an improved braking force under wet conditions and when icing occurs.

In further disclosed embodiments, the first group support is attached to an end position of the lining support, wherein of all the positions of the group supports on the lining support the end position represents a first or last position on the lining support, to be precise with respect to a relative movement between a brake disk of the disk brake and the brake lining Optionally, one of the first lining elements can be attached directly to the lining support at an end position. This may be the case, in particular, if no group supports are present. The "end position" is to be understood here as meaning that when there is a relative movement between the brake disk and the brake lining the corresponding lining elements (e.g. on the respective group support) firstly or lastly come into contact with a specific position on the brake disk. All the positions of components such as, for example, the lining elements can be understood to be locations of the center of mass of the respective component.

In further disclosed embodiments, the lining elements have third lining elements, and the group supports have a third group support, wherein the third lining elements are arranged in a non-tiltable fashion on the third group support, and the third group support is arranged at a further end position of the lining support which lies opposite the end position. The lining elements optionally have a third lining element which is attached directly to the lining support at a further end position. This can be the case in particular if no group supports are present.

Therefore, with respect to the relative direction of movement between the brake disk and the lining elements, all the further lining elements are arranged between the lining elements of the first group and the lining elements of the third group or between the first and the third lining elements if these lining elements are attached directly to the lining support. The position of the lining elements or of the group supports can in turn be assigned unambiguously to a position on the lining support by means of the position of their centers of mass. Furthermore, the position can be defined as an angular position with respect to a rotational axis of the brake disk, with the result that each lining element can be assigned a specific angular position with respect to the brake disk. The arrangement sequence can therefore be defined unambiguously with respect to the angular position.

In further disclosed embodiments, a gap is formed between the second lining element or elements and the second group support or the lining support in order to permit tilting of the second lining elements. The gap width of the gap defines a measure of possible tilting. If the gap width is equal to zero or the gap width cannot be changed (e.g. by means of spacer elements), the term non-tiltable securement is used.

In further disclosed embodiments, at least one lining element is arranged in a non-tiltable or tiltable fashion on the respective group support (or on the lining support), or all the lining elements are arranged in a non-tiltable or tiltable fashion on the respective group supports (or on the lining support). For example, the first lining elements can lie in a gap-free fashion on the first group support (i.e. no gap is formed between them), in order thereby to prevent tilting.

In further disclosed embodiments, the first, second and third group supports are part of a multiplicity of group supports, at least one group support of which (or all the group supports) is/are attached in a non-tiltable fashion on the lining support. Optionally, one or more group supports can also be attached in a tiltable fashion to the lining support.

In further disclosed embodiments, all the lining elements of a group of lining elements are arranged in a non-tiltable fashion on the respective group support. However, they can also be tiltable.

In further disclosed embodiments, the lining elements are arranged on the respective group supports or on the lining support in a rotatable fashion and/or the group supports are arranged in a rotatable fashion on the lining support. For example, at least the tiltable lining elements are rotatably arranged on the respective group support.

In further disclosed embodiments, the lining elements are arranged in a rotationally fixed fashion on the respective group supports or the lining support.

In further disclosed embodiments, the lining elements are embodied as polygons, wherein at least some of the lining elements adjoin one another with their side edges in order in this way to prevent or limit rotation. One possible way of arranging the lining elements in a rotationally fixed fashion on the respective group support is to form the lining elements in the form of an n corner, so that the respective side faces of the n corner adjoin one another and therefore rotation of the lining elements is prevented. The lining elements which are configured with n corners can be formed, for example, as triangles, quadrilaterals, pentagons, hexagons or as any other desired geometric shape. A gap between the side edges can optionally permit limited rotation.

In further disclosed embodiments, at least some of the lining elements are attached to the respective group supports or to the lining support by means of ball and socket joints. Furthermore, at least some of the group supports can be attached to the lining support by means of ball and socket joints. The ball and socket joints can permit rotation about a rotational axis and/or tilting with respect to the rotational axes, wherein the rotational axis is perpendicular with respect to the distribution of the lining elements. For example, a spherical cap joint can be formed between the lining support and the support plate (group support) in order to permit tilting/rotation.

In further disclosed embodiments, the lining elements are pre-stressed elastically in relation to the respective group supports or the lining support by means of springs.

In further disclosed embodiments, the lining elements each have an attachment element which comprises a spherical-cap-shaped section in order to make available a spherical-joint-shaped connection to the respective group supports or the lining support. The attachment elements have, for example, a metal, and the lining elements have a nonmetal (with a particularly high friction with respect to the brake disk). The spherical-cap-shaped joints permit, for example, rotations and/or tilting of the lining elements (e.g. in any desired directions).

In further disclosed embodiments, the first and/or third lining elements comprise another frictional material (or are made of another frictional material) than the second lining elements.

Further advantageous embodiments comprise the rigidly supported lining elements in the group elements at the ends of the brake lining. In further embodiments, not only the lining elements of individual group elements are rigidly connected to the support plate (group support) but also the respective group support is rigidly attached to the lining support (e.g. at the ends). Through the combination of lining elements which are supported in an articulated fashion and lining elements which are rigidly connected, disclosed embodiments also permit a good supporting pattern and good behavior under wet conditions.

The presently disclosed embodiments relate to a disk brake having one of the brake linings described above. Furthermore, the presently disclosed embodiments also relate to a rail vehicle having the specified disk brake.

FIG. 1 shows a brake lining for a disk brake, which brake lining comprises a distribution of lining elements 111, 112, ... which are arranged in groups on group supports 121, 122, .... The group supports 121, 122, ... are attached to the lining support 130. The lining elements 111, 112, ... have first lining elements 111 and second lining elements 112, and the group supports 121, 122, ... have a first group support 121 and a second group support 122, wherein the first lining elements 111 are arranged in a non-tiltable fashion on the first group support 121, and the second lining elements 112 are arranged in a tiltable fashion on the second group support 122. The first lining elements 111 form, for example, a first group, and the second lining elements 112 form, for example, a second group. All the further lining elements are combined analogously into groups.

The terms "tilt" or "tiltable" relate to (partial) rotation about a rotational axis which lies in the planar extent of the brake lining or of the lining support 130.

Figure 2:
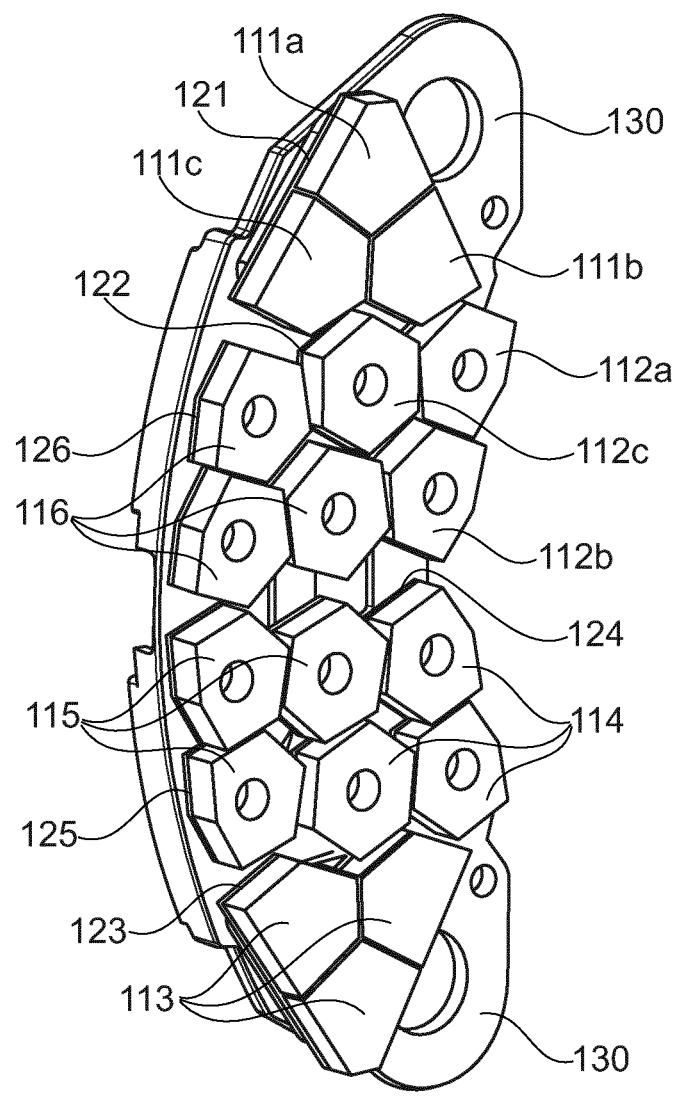
FIG. 2 shows a spatial view of a brake lining according to disclosed embodiments.

FIG. 2 shows a spatial view of a brake lining according to a further disclosed embodiment. The brake lining comprises in total six groups 111, ..., 116 of lining elements which are arranged on the lining support 130. Each group has three lining elements, wherein the first group 111 is arranged with the three lining elements 111a, 111b, 111c at one end of the lining support 130, and a third group 113 of lining elements is arranged at an opposite end of the lining support 130. The ends of the lining support 130 are, for example, defined by virtue of the fact that they are arranged at the start and end in relation to a relative movement between the brake lining and a disk brake (not shown in FIG. 2).

All the further groups are arranged between the first group 111 and the third group 113 of lining elements. For example, the second group 112 is arranged with the three lining elements 112a, 112b, 112c, and the fourth group 114 of lining elements is arranged between the first group 111 and the third group 113. Likewise, the fifth group 115 and the sixth group 116 is arranged between the first group 111 and the third group 113. The second group 112 is arranged, for example, laterally next to the sixth group 116, and the fourth group 114 is arranged laterally next to the fifth group 115, wherein this position relates in turn to the relative direction of movement between the brake lining and the brake disk. However, the arrangement shown represents only one possible implementation. In further disclosed embodiments, the arrangement of the lining elements can also be different.

Each group of lining elements is respectively secured to the lining support 130 by a group support 121, 122, .... The first group 111 is assigned a first group support 121, the second group 122 is assigned a second group support 122, the third group 113 is assigned a third group support 123, the fourth group 114 is assigned a fourth group support 124, the fifth group 115 is assigned a fifth group support 125, and the sixth group 116 is assigned a sixth group support 126. The first group 111 of lining elements is attached in a rigid or fixed fashion to the first group support 121, wherein the corresponding three lining elements are at maximum rotatable, but not tiltable. The third group 113 is also secured in a rigid fashion to the third group support 123, wherein the corresponding three lining elements are at maximum rotatable, but not tiltable. The further lining elements from the second group 112, the fourth group 114, the fifth group 115 and the sixth group 116 are, for example, arranged in a tiltable fashion on the corresponding group supports 122, 124, 125, 126. The individual group supports 121, ..., 126 can also be secured to the lining support 130 in a tiltable fashion, with the result that the first group 111 of lining elements can move in a tilting fashion together with the first group support 121 on the lining support 130. The same applies to the third group 113 of lining elements which can also be tiltable with respect to the lining support 130.

The lining elements 111, ..., 116 are, for example, embodied in a pentagonal fashion, wherein the individual side faces of the pentagon can touch one another but do not have to touch one another. For example, the lining elements of the first group 111 are arranged adjacently, with adjoining side faces, in such a way that a relative rotation between the lining elements is prevented. The same applies to the lining elements of the third group 113. All the further lining elements of the second group 112, of the fourth group 114, of the fifth group 115 and of the sixth group 116 can be, for example, partially rotatable (e.g. about a rotational axis which is perpendicular to the braking surface). The rotation of all the lining elements can, however, also be at least partially restricted or suppressed by the fact that side faces of the lining elements which are, for example, embodied in a pentagonal fashion adjoin one another and a gap between them makes possible only limited rotation of the lining elements.

In further disclosed embodiments, the lining elements can also be embodied in a circular shape or can have a different n-cornered shape (e.g. triangular, quadrilateral, pentagonal, hexagonal, ... ), i.e. the presently disclosed embodiments are not restricted to the disclosed pentagonal lining elements shown.

However, in further disclosed embodiments some or all of the lining elements 111, ..., 116 are attached to the respective group support in such a way that they are rotatable at least up to a certain degree. Furthermore, all or some of the group supports 121, 122, . . . can be rotatably attached to the lining support 130.

Figure 3:
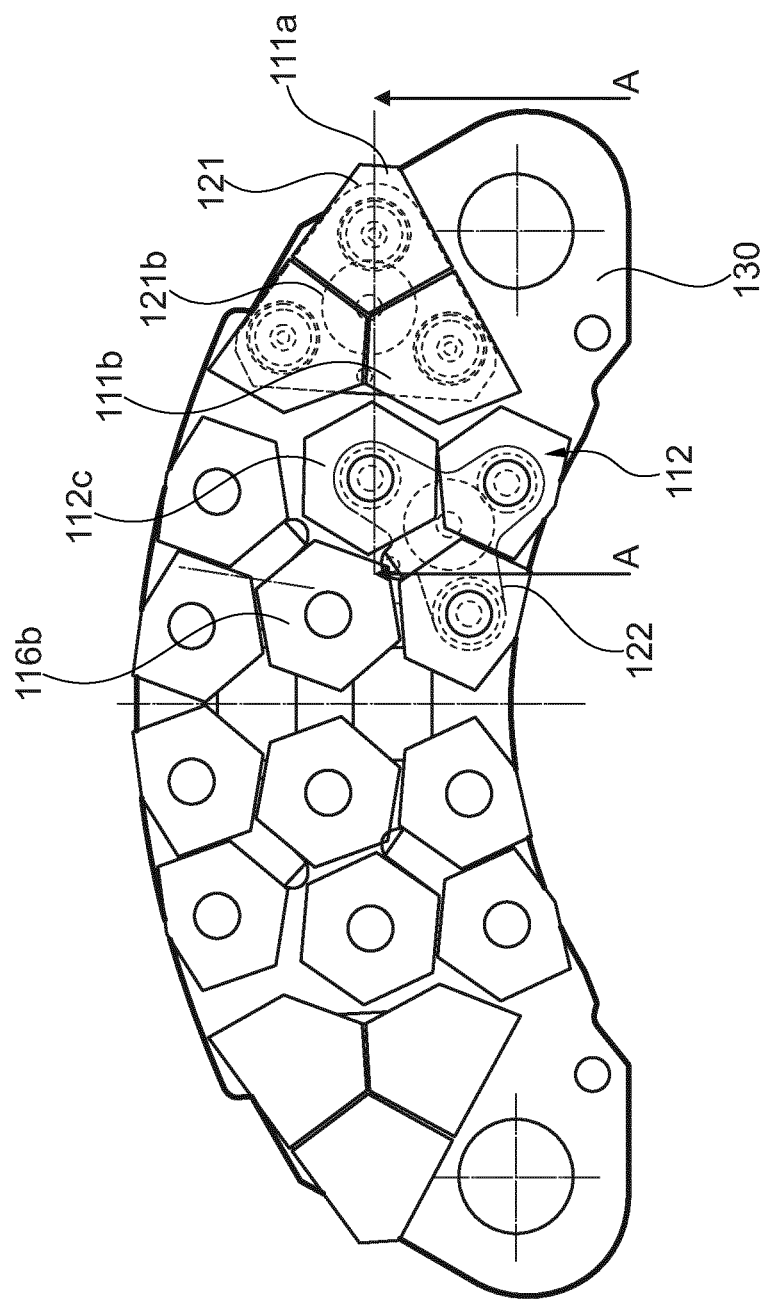
FIG. 3 shows a plan view of a brake surface of the brake lining in FIG. 2.

FIG. 3 shows a plan view of the brake lining from FIG. 2. In this plan view, the ends of the brake lining 130 are arranged on the right-hand and left-hand sides, wherein the first group 111 is the group which is located furthest to the right. The first group support 121, which lies underneath the lining elements 111, is shown in this illustration by means of a dashed line. The concentric circles which are illustrated in the form of a circle underneath the lining elements 111, 112 constitute an disclosed ball and socket joint with which the first lining elements 111 are secured to the first group support 121. A further ball and socket joint 121b is illustrated at a central region of the first group support 121 and it represents the joint connection between the first group support 121 and the lining support 130. Likewise, the second group support 122, which also lies underneath the second group 112 of lining elements, is illustrated by dashes in FIG. 3.

Figure 4:
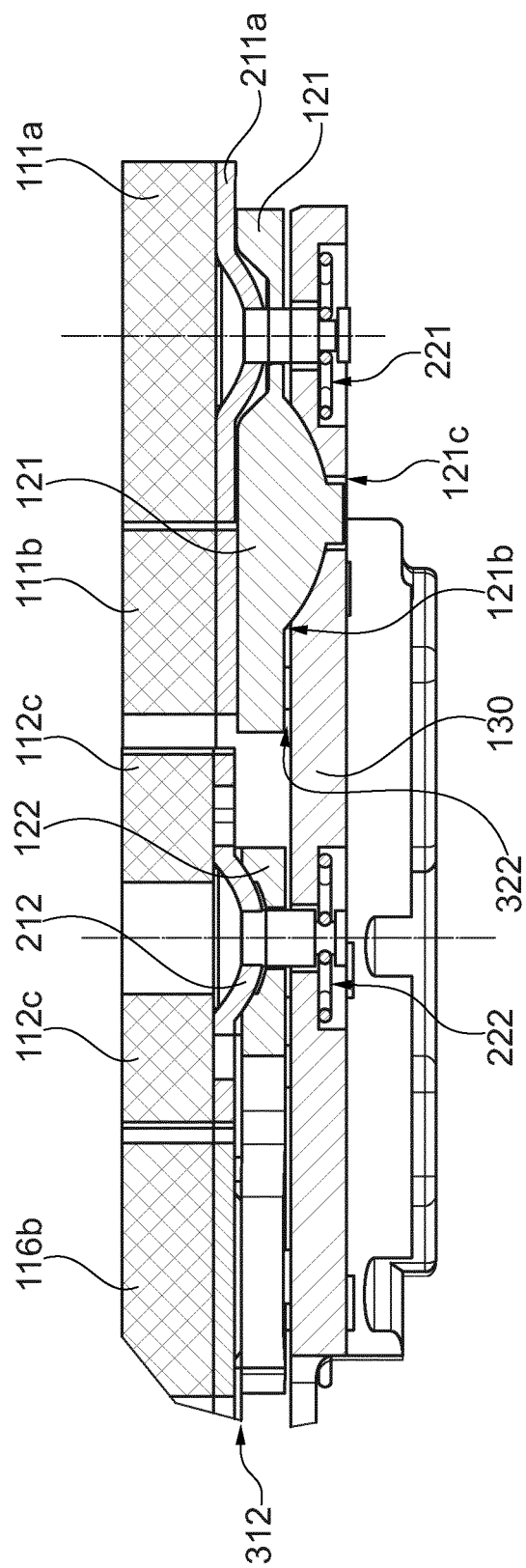
FIG. 4 shows a cross-sectional view along the cross section A-A from FIG. 3.

FIG. 4 shows a cross-section view along the cross-sectional line A-A from FIG. 3. The cross section A-A passes through the first group 111 of lining elements with the first group support 121, through the second group 112 of lining elements with the second group support 122, and through some of the sixth group 116 of lining elements (see also FIG. 2). For example, a first element 111a of the first group 111 is secured to the first group support 121 by a spherical cap joint with a first spring attachment 221. These and all the other spring attachments serve to make available a prestress, with the result that the lining elements 111, 112, . . . have sufficient elasticity and return again to an initial position after tilting.

The securement is carried out, for example, by means of a first attachment structure 211a which holds the first lining element 111a from its rear side (i.e. with respect to the braking surface). The first group support 121 is also attached to the lining support 130 by means of a ball and socket joint, wherein the lining support 130 has a spherical opening between an external boundary 121b and an internal boundary 121c which accommodates a spherical cap-shaped protrusion on the first group support 121. As is apparent from FIG. 3, the internal and external boundaries 121c, 121b are parts of circles, i.e. these structures are symmetrical in a circular fashion.

A third lining element 112c of the second group 112 is in turn attached to the second group support 122 by means of an attachment structure 212. For this attachment, a second spring attachment 222 is also provided which makes available a prestress for the attachment of the second group support 122 to the lining support 130.

Finally, a second element 116b of the second group 116 of lining elements is illustrated on the left-hand side of the cross section in FIG. 4, the group support of which second element 116b cannot be seen in the cross-sectional view.

In the disclosed embodiment in FIG. 4, no gap is formed between the first group support 121 and the lining elements 111a, 111b of the first group 111, i.e. the first group support 121 is in direct contact with the attachment structure 211a for the first lining element 111a of the first group 111 (i.e. the first lining element 111a is arranged in a non-tiltable fashion on the first group support 121). The same applies to the other lining elements of the first group 111.

On the other hand, in this disclosed embodiment a gap 312 is formed between the second group support 122 and the attachment structure 212 of the second group 112. This gap 312 allows the lining elements 112c of the second group 112 to tilt up to a certain degree (as a function of the gap width). The second spring attachment 222 again exerts a pre-stress which positions the second lining element 112 in a preferred direction.

A further gap 322 can optionally be formed between the first group support 121 and the lining support 130, which further gap 322 permits a joint-like support of the first group support 121 on the lining support 130, with the result that the first group support 121 is also secured in a tiltable fashion on the lining support 130. The same applies to the other group supports.

In further disclosed embodiments, the first group element 121 (and also the second or all the other group elements) can also be secured rigidly to the lining support 130. This can be achieved in that the further gap 322 between the group supports 121, 122, . . . and the lining support 130 disappears or is selected to be as small as possible so that the first group support 121 rests in a planar fashion directly on the lining support 130, and rocking or tipping of the first group support 121 is prevented.

The gaps 312, 322 which are formed on both sides of the group supports 121, 122, . . . therefore permit the corresponding lining elements or group supports to be able to be tilted around the center point of the spherical cap joint. The lining elements 111, 112, . . . themselves as well as the group supports 121, 122, . . . can therefore be attached in a rocking fashion to the lining support 130.

Figure 5:
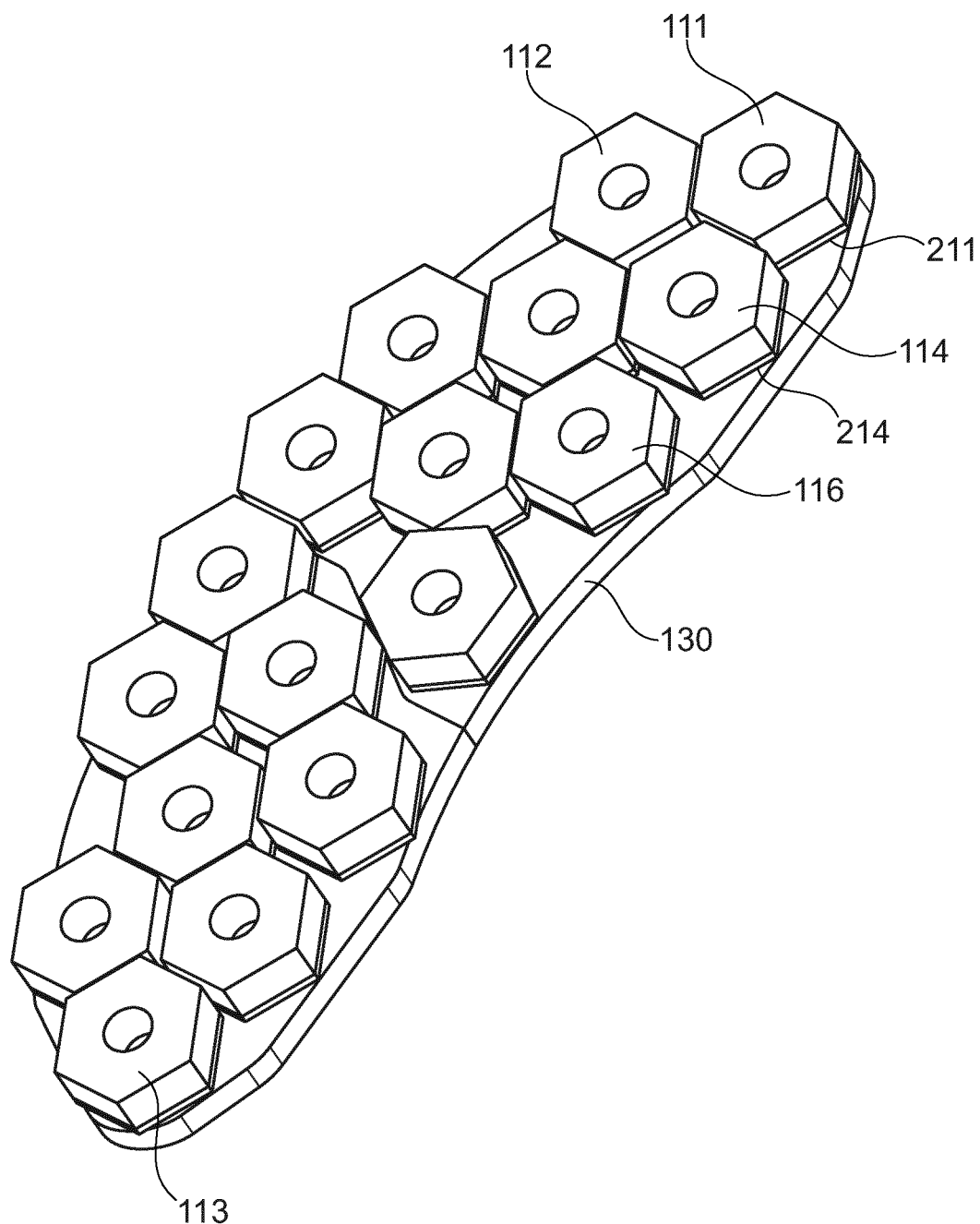
FIG. 5 shows a spatial view of a brake lining without a group support according to further disclosed embodiments.

FIG. 5 shows a brake lining, wherein in this disclosed embodiment no group supports 121, 122 are formed. The lining elements 111, 112, . . . are instead attached directly to the lining support 130, wherein at least one lining support 111 is attached in an inflexible or non-tiltable fashion to the lining support 130. However, a plurality of lining elements 111, 113 can optionally be non-tiltable or inflexible. These non-tiltable or inflexible lining elements 111, 113 (as well as the first and/or third lining elements mentioned above) can be formed, for example, at the end positions of the lining support 130. Further lining elements 112, 114 (like the second lining elements mentioned above) can be attached to the lining support 130 in a tiltable or flexible fashion, wherein the further lining elements 112, 114 are, for example, those lining elements which are located between the respective ends of the lining support 130. As in the disclosed embodiment mentioned above, the lining elements 112, 114, . . . are attached to the lining support 130 by means of attachment elements 211, 214.

Figure 6:
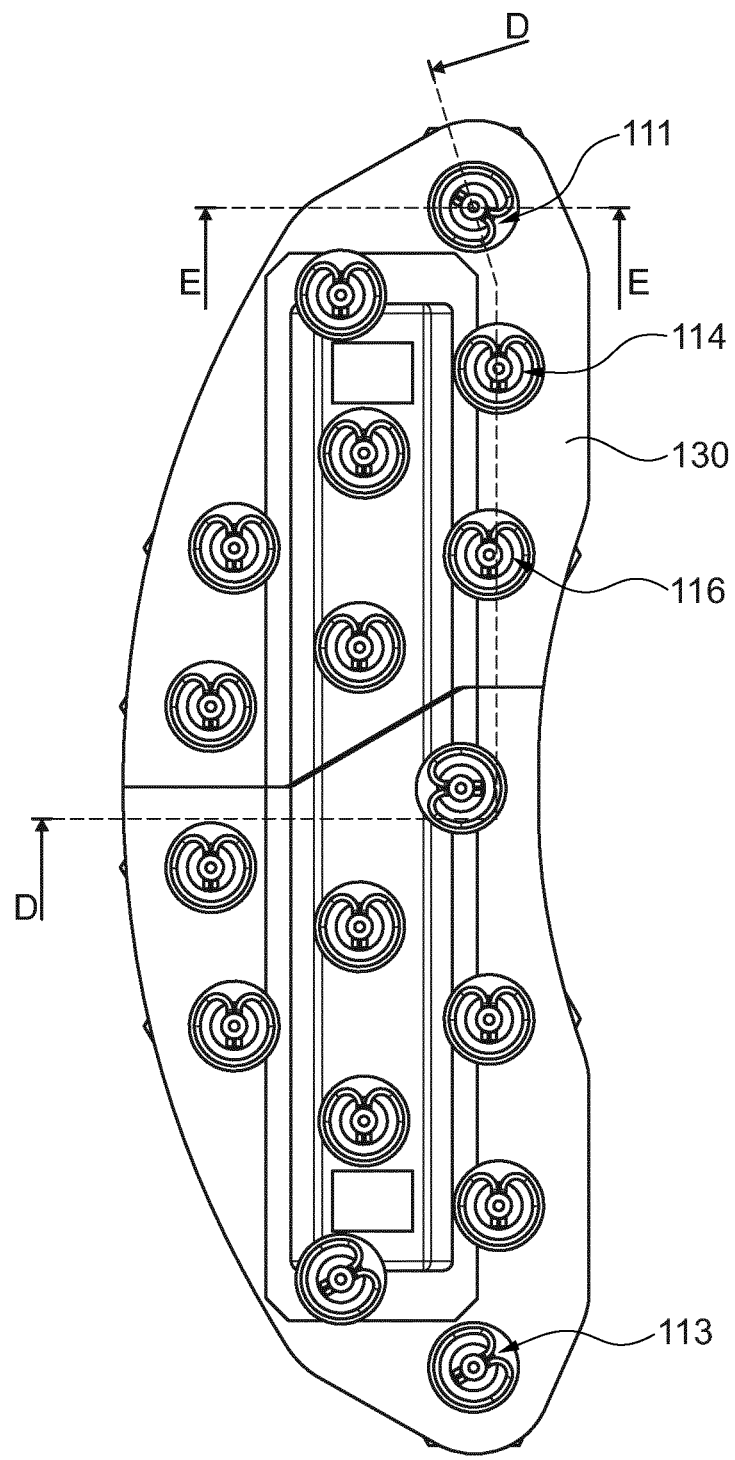
FIG. 6 shows a view of the underside of the brake support from FIG. 5.

FIG. 6 shows a view of the lining support 130 from its underside, i.e. from the side which faces away from the brake disk and the lining elements 111, 112, . . . . On the underside which is shown, non-tiltable lining elements 111, 113 are in turn provided at the end positions, while the other lining elements 114, 116 which are arranged between the non-tiltable lining elements 111 and 113 with respect to the relative direction of movement of the lining support 130 in relation to the brake disk, are in turn attached to the lining support 130 in a tiltable fashion. The attachment of the lining elements 111, 112, . . . which is shown on the underside is carried out by means of spring elements which are described in more detail below.

Figure 7:
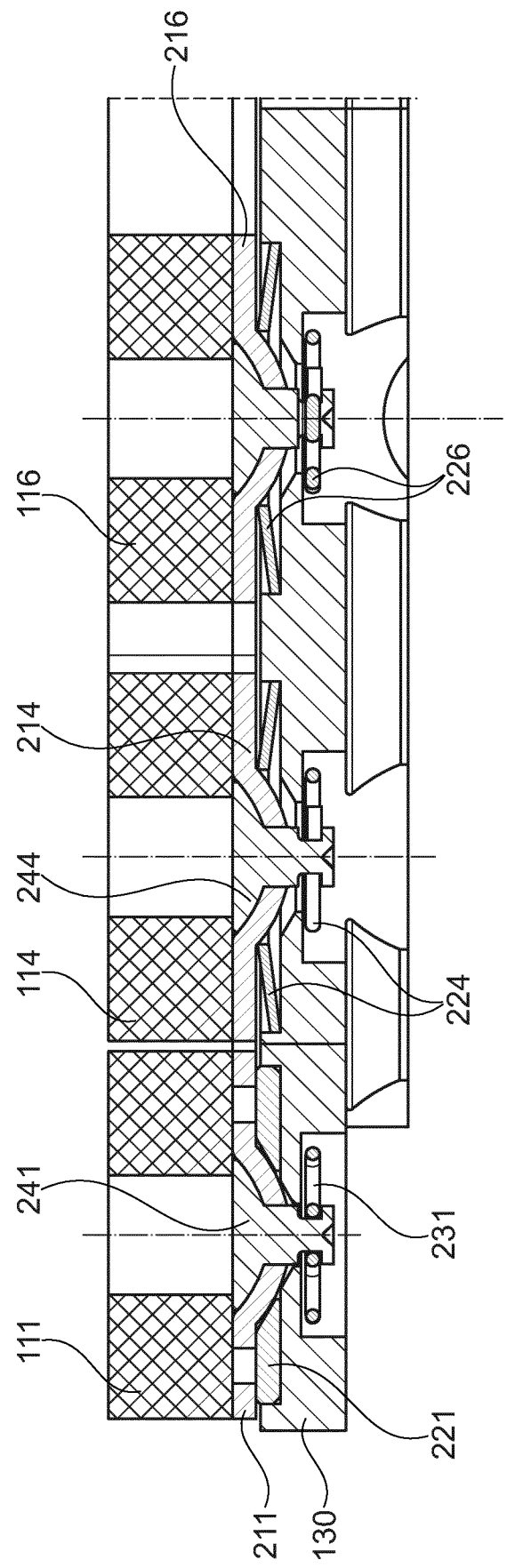
FIG. 7 shows a cross-sectional view along the cross-sectional line D-D from FIG. 6.
Figure 8:
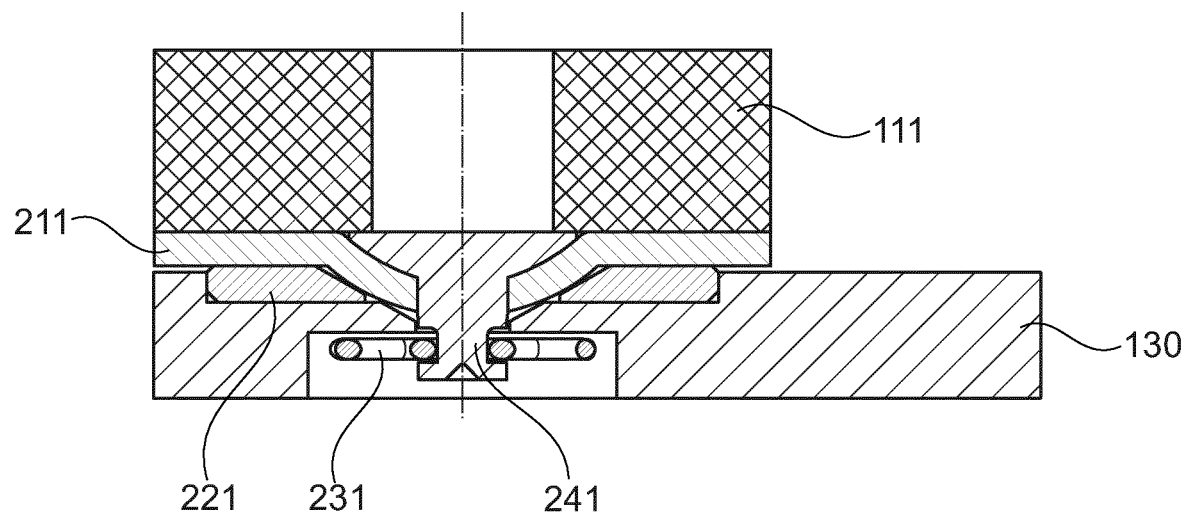
FIG. 8 shows a cross-sectional view along the cross-sectional line E-E from FIG. 6.

FIGS. 7 and 8 relate to cross-sectional views, wherein FIG. 7 shows a cross sectional view along the cross-sectional line D-D, and FIG. 8 shows a cross-sectional view along the cross-sectional line E-E (see FIG. 6).

FIG. 7 shows three lining elements 111, 114, 116 which are attached to the lining support 130 by means of attachment elements 211, 214, 216. Openings at each position of the three lining elements 111, 114, 116, through which securing structures 241, 244, . . . are guided, are provided in the lining support 130. The securing structures 241, 244, . . . can be configured, for example, in a bolt shape, with the result that their widened portions hold the attachment elements 211, 214, 216, and the rod-shaped sections extend through the lining support 130 and are held on the lining support 130 from the opposite side by means of spring attachments 231, 224, 226.

The first securing structure 241 serves to secure the first lining element 111 and secures the first attachment element 211 to the lining support 130 in a non-tiltable or inflexible fashion. For this purpose, the first attachment element 211 is attached in such a way that it rests on the lining support, wherein an optional intermediate element 221 is formed between the first attachment element 211 and the lining support 130. This intermediate element 211 serves, for example, to support the attachment element 211, optionally configured in a spherical shape, in an optionally spherical-cap-shaped depression of the intermediate element 211. As a result, for example partial rotation can be made possible. In particular, no gap needs to be formed between the first lining element 111 and the intermediate element 221, with the result that the first lining element 111 is attached to the lining support 130 in a non-tiltable or inflexible fashion.

In comparison thereto, the fourth lining element 114 and the sixth lining element 116 are attached in a tiltable fashion to the lining support 130. For this purpose, the fourth attachment element 214, like the first lining element 111, is attached in a sprung fashion to the lining support 130 by means of a spring structure 224, for example via a securing structure 244. In contrast to the first attachment element 211, a gap is formed between the attachment element 214 of the fourth lining element 114 and the lining support 130. The spring mount 224 optionally has, on the side of the lining support 130 facing the lining elements, a spring-leaf-like intermediate element which prestresses the fourth lining element 114 at a certain distance from the lining support 130.

The sixth lining element 116 is secured in the same way to the lining support 130 as the lining element 114, i.e. also the sixth lining element 116, is held at a predetermined distance from the lining support 130 by the spring support 216.

Therefore, in the disclosed embodiment shown only the first lining element 111 is attached directly to the lining support 130 or the optionally formed intermediate element 221 without an intermediate space, while the fourth and the sixth lining elements 114, 116 are held in a tiltable fashion on the lining support 130 by means of a spring structure 224, 226. The gap between the attachment elements 214, 216 and the lining support 130 can be formed here in a similar fashion to the gap 312 or the further gap 322 in the disclosed embodiments from FIG. 4.

FIG. 8 shows an enlarged cross-sectional view through the first lining element 111. From this illustration it becomes clearly apparent that the first lining element 111 rests with its attachment element 211 directly on the lining support 130 or an intermediate element 221 is formed between the lining support 130 and the first attachment element 211. The intermediate element 221 serves in particular to provide support, but does not permit the first lining element 111 to tilt. The first lining element 111 is mounted again by means of a bolt mount 241 which is attached to the spring attachment 231 and widens behind an opening of the attachment element 211 and therefore ensures reliable mounting of the first lining element 111.

The disclosed embodiments which are shown with group supports (FIGS. 2-4) or without group supports (FIGS. 5-8) are not to be considered as alternative but rather can also be combined with one another. Therefore, a number of group supports 121, 122, . . . can be omitted from the brake lining in FIG. 2, wherein the corresponding lining elements can be attached to the lining support in a directly tiltable or non-tiltable fashion. The same applies to the disclosed embodiment in FIG. 5, in which a number of lining elements can be grouped and can be attached to the lining support 130 by means of one or more group supports.

The frictional materials of the various lining elements 111, 112, 113, . . . can be the same or also different It is therefore possible, for example, for the first lining element 111 and the third lining element 113, which are attached in a non-tiltable fashion to the lining support 130, to have a different frictional material than the other lining elements 112, 114, . . . , which are attached in a tiltable fashion to the lining support 130. For example, the frictional material of the non-tiltable lining elements 111, 113 can have a better wear performance It is optionally also possible for wiping elements to be provided which serve to remove a layer of water or ice on the brake disk and therefore to ensure better contact between the lining elements 111, 112, 113, . . . and the brake disk. The wiping structure can comprise, for example, a silicone lip or similar structure which is suitable for wiping off water or ice from the brake disk. Possible frictional materials are what are referred to as semi-metallic frictional materials (more than 30% metal) or hardly metallic frictional materials (less than 30% metal), organic or ceramic frictional materials or a combination of these materials. Without restricting the disclosed embodiments thereto, hardly metallic or ceramic frictional materials can be used, for example, for the non-tiltable lining elements 111, 113.

Exemplary embodiments have the following advantages. For example, the rigidly supported lining elements 111, 113 can better remove water or a layer of ice from the surface of the brake disk than lining elements 112, 114, 115, 116 which are supported in an articulated fashion. The lining elements 112, 114, 115, 116 which are supported in an articulated fashion have a tendency to tip or tilt when there is resistance on the brake disk. If, for example a layer of ice forms on the frictional face of the brake disk at low temperatures and when there is high humidity this layer can therefore be removed more quickly by the rigidly supported lining elements 111, 113 which are arranged on both sides of the lining elements 112, 114, 115, 116 which are mounted movably. As a result, the braking torque is increased more quickly. Furthermore, the braking behavior under wet conditions is improved, since "floating up" of the lining as a result of locally relatively high contact pressure per unit area is reduced.

The features disclosed in the description, the claims and the figures can be for the implementation of the disclosed embodiments both individually and in any desired combination.

LIST OF REFERENCE NUMBERS 111, 112, . . . Lining elements
121, 122, . . . Group supports
130 Lining supports
211, 212, 216 . . . Attachment elements
221, 222, 224, 226 Spring attachments
312 Gap
322 Further gap
The invention claimed is:
1. A brake lining for a disk brake, the brake lining comprising:

a distribution of a plurality of lining elements arranged in groups on a lining support or on a group support of a plurality of group supports, wherein the group supports are attached to the lining support, wherein the plurality of lining elements include one or more first lining elements and second lining elements, wherein the first lining elements are arranged in a non-tiltable and/or inflexible fashion on a first group support and coupled to the lining support, and the second lining elements are arranged in a tiltable and/or flexible fashion on a second group support and coupled to the lining support.

2. The brake lining of claim 1, wherein the first group support is attached to an end position of the lining support, wherein, of all the positions of the group supports on the lining support, the end position is a first position or last position on the lining support with respect to a relative movement between a brake disk or disk brake and the brake lining.

3. The brake lining of claim 2, wherein the lining elements have at least a third lining element, wherein the group supports have a third group support, wherein the third lining elements are arranged in a non-tiltable fashion on the third group support, and the third group support is arranged at a further end position of the lining support which lies opposite the end position.

4. The brake lining of claim 3, wherein the first, second and third group supports are part of the plurality of group supports, wherein at least one group support of which is attached in a non-tiltable fashion or tiltable fashion on the lining support.

5. The brake lining of claim 1, wherein a gap is formed between the second lining elements and the second group support to permit tilting of the second lining elements.

6. The brake lining of claim 1, wherein the first lining elements lie in a gap-free fashion on the first group support to prevent tilting.

7. The brake lining claim 1, wherein all the lining elements of a group of lining elements are arranged in a non-tiltable or tiltable fashion on the respective group support.

8. The brake lining, of claim 1, wherein the lining elements are arranged on the respective group supports in a rotatable fashion and/or the group supports are arranged in a rotatable fashion on the lining support.

9. The brake lining of claim 1, wherein the lining elements are arranged in a rotationally fixed fashion on the respective group supports.

10. The brake lining of claim 9, wherein the lining elements are polygons, wherein at least some of the lining elements adjoin one another with at least one of their side edges to prevent rotation.

11. The brake lining of claim 1, wherein at least some of the lining elements are attached to the respective group supports by ball and socket joints, and/or at least some of the group supports are attached to the lining support by ball and socket joints, wherein the ball and socket joints permit rotation about a rotational axis and/or tilting with respect to the rotational axis, and wherein the rotational axis is perpendicular with respect to the distribution of the lining elements.

12. The brake lining of claim 1, wherein the lining elements are pre-stressed elastically in relation to the respective group supports by springs.

13. The brake lining of claim 1, wherein lining elements include attachment elements, which comprise a spherical-cap-shaped section to provide a spherical-joint-shaped connection to the respective group supports.

14. The brake lining of claim 1, wherein the first lining elements have a different frictional material than the second lining elements.

15. A disk brake having a brake lining, wherein the brake lining has a distribution of a plurality of lining elements arranged in groups on a lining support or on a group support of a plurality of group supports, wherein the group supports are attached to the lining support wherein the plurality of lining elements include one or more first lining elements and second lining elements, wherein the first lining elements are arranged in a non-tiltable and/or inflexible fashion on a first group support coupled to the lining support, and the second lining elements are arranged in a tiltable and/or flexible fashion on a second group support-coupled to the lining support.

16. A rail vehicle having a disk brake including a brake lining, wherein the brake lining has a distribution of a plurality of lining elements arranged in groups on a lining support or on a group support of a plurality of group supports, wherein the group supports are attached to the lining support, wherein the plurality of lining elements include one or more first lining elements and second lining elements, wherein the first lining elements are arranged in a non-tiltable and/or inflexible fashion on a first group support and coupled to the lining support, and the second lining elements are arranged in a tiltable and/or flexible fashion on a second group support and coupled to the lining support.

17. The rail vehicle of claim 16, wherein the first group support is attached to an end position of the lining support, wherein, of all the positions of the group supports on the lining support, the end position is a first position or last position on the lining support with respect to a relative movement between a brake disk or disk brake and the brake lining.

18. The rail vehicle of claim 17, wherein the lining elements have at least a third lining element, wherein the group supports have a third group support, wherein the third lining elements are arranged in a non-tiltable fashion on the third group support, and the third group support is arranged at a further end position of the lining support which lies opposite the end position.

19. The rail vehicle of claim 16, wherein a gap is formed between the second lining elements and the second group support to permit tilting of the second lining elements.

20. The rail vehicle of claim 16, wherein the first lining elements lie in a gap-free fashion on the first group support to prevent tilting.

* * * * *